United States Patent [19]

Giannini et al.

[11] 4,174,429
[45] Nov. 13, 1979

[54] PROCESS FOR POLYMERIZING OLEFINS

[75] Inventors: Umberto Giannini; Enrico Albizzati, both of Milan; Sandro Parodi, Oleggio; Franco Pirinoli, Milan, all of Italy

[73] Assignee: Montedison S.p.A., Milan, Italy

[21] Appl. No.: 936,630

[22] Filed: Aug. 23, 1978

Related U.S. Application Data

[62] Division of Ser. No. 670,951, Mar. 26, 1976, Pat. No. 4,124,532.

[30] Foreign Application Priority Data

Mar. 28, 1975 [IT] Italy .................... 21815 A/75

[51] Int. Cl.$^2$ .................... C08F 4/66; C08F 10/00
[52] U.S. Cl. .................... 526/114; 526/115; 526/122; 526/125; 526/351; 526/352
[58] Field of Search ............ 526/114, 115, 122, 125

[56] References Cited

U.S. PATENT DOCUMENTS

| | | | |
|---|---|---|---|
| 2,935,500 | 5/1960 | Nowlin et al. | 526/125 |
| 3,583,958 | 6/1971 | Sasaki et al. | 526/125 |
| 3,850,842 | 11/1974 | Lonzi et al. | 526/125 |
| 3,989,881 | 11/1976 | Yamagushi et al. | 526/125 |

FOREIGN PATENT DOCUMENTS 1310547  3/1973  United Kingdom ............ 526/125

*Primary Examiner*—Edward J. Smith

[57] ABSTRACT

New catalysts for the polymerization and copolymerization of olefins are disclosed. The catalysts are prepared from (1) a new class of metal compounds containing at least one atom of Mg, Mn or Ca and at least one atom of Ti, V or Zr and (2) organometallic compounds of metals belonging to one of Groups I to III of the Mendelyeev Periodic Table.

4 Claims, No Drawings

PROCESS FOR POLYMERIZING OLEFINS

This is a division of application Ser. No. 670,951, filed Mar. 26, 1976, now U.S. Pat. No. 4,124,532.

THE PRIOR ART

It is known to polymerize and copolymerize ethylene in the presence of catalysts of various types, and in particular catalysts consisting of the product of reaction between a compound of Ti, V or Zr and an organometallic compound of a Group I to III metal.

Among the titanium compounds suggested for use were the halo-titanates having the formula $M_2TiX_{n+2}$, in which M is an alkali metal or a quaternary ammonium group; X is a halogen, preferably Cl or Br; and n is the titanium valence. Some typical compounds of this class are $Na_2TiCl_6$; $K_2TiCl_6$; and $[N(C_2H_5)_4]_2TiCl_6$.

The catalysts prepared starting from the above-mentioned halo-titanates exhibit a very low activity in the polymerization of ethylene and alpha-olefins and are generally much less active than the corresponding titanium halides.

For this reason, they are not employed in the commercial production of polyolefins.

With one exception, the halo-titanates having the formula $M_2TiX_{n+2}$, in which M is a metal of Group II of the Mendelyeev Periodic Table were unknown heretofore. The exception is $MgTiF_6$ which, however, exhibits no meaningful catalytic activity in the polymerization of olefins.

THE PRESENT INVENTION

Surprisingly, we have found it is possible to use, as one component of catalysts for olefin polymerization, a new class of metal compounds containing at least one atom of Mg, Mn or Ca and at least one atom of Ti, V or Zr. Such compounds, when combined with organometallic compounds of the metals belonging to one of Groups I to III of the Mendelyeev Periodic Table provide catalysts which are very highly active in the polymerization of olefins.

The new catalyst components of this invention are complexes having the general formula $$M_mM'X_{2m}Y.nE$$

wherein
M=Mg, Mn and/or Ca;
m=a number from 0.5 to 2;
M'=Ti, V and/or Zr;
X=Cl, Br or I;
Y=one or more atoms or groups of atoms, which may be the same or different, selected from atoms of halogen; atoms of halogen and, contemporaneously, atoms of oxygen, $-NR_2$; $-OR$; $-SR$;

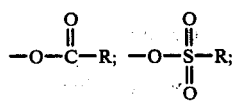

(in which groups R is a hydrocarbon radical, in particular an alkyl, aryl, cycloalkyl or aralkyl radical), acetylacetonate anion; acetylacetonate anion and, contemporaneously, oxygen atoms; the groups or atoms being present in such an amount as to satisfy the valence of M';

n=a number from 0.5 m to 20 m;
E=an electron-donor compound selected from the following classes of compounds:
(a) esters of organic carboxylic acids;
(b) alcohols;
(c) ethers;
(d) amines;
(e) esters of carbonic acid;
(f) nitriles;
(g) phosphoramides, esters of phosphoric and phosphorous acid and phosphorus oxychloride.

In the above formula, a portion of the Ti, V and/or Zr may be substituted by metals selected from Zn, Al, Sn and transition metals, such as Fe, Co, Ni, Cr, Mo in such an amount that the atomic ratio between such metals and Ti, V and/or Zr will range from 0.1:1 to 2:1.

Among the cited classes of useful electron-donors (a) to (g), particularly interesting results are obtained with alkyl esters of aliphatic or aromatic acids in which the alkyl radical contains from 1 to 8 carbon atoms; ROR' ethers in which R and R', the same or different, are alkyl radicals containing from 1 to 8 carbon atoms or aryl radicals; aromatic nitriles; and alkyl esters of phosphoric or phosphorous acid, in which the alkyl radicals contain from 1 to 8 carbon atoms.

Typical compounds of the last-mentioned preferred classes of electron-donors, which have given the best results as regards the activity of the catalysts obtained from them, are: ethyl acetate, ethyl benzoate, diethyl malonate, methanol, ethanol, ethyl ether, tetrahydrofuran, pyridine, ethylene carbonate, benzonitrile, phosphorus oxychloride, hexamethyl phosphoramide and triphenyl phosphite.

The new catalyst-forming complexes can be prepared by reacting, in suitable ratios, the halide $MX_2$ with the compound M'Y, at a temperature of from room temperature to 150° C., in particular solvents E which act as electron-donor compounds, and are isolated by crystallization from the same solvent, by evaporation of the solvent, or by precipitation with a solvent in which the complexes are insoluble.

If the halide $MX_2$, the compound M'Y, or both, are poorly soluble in solvent E, the reaction can be carried out in another suitable electron-donor solvent E', to obtain a complex $M_mM'X_{2m}Y.nE'$ which, after isolation, can be treated, at a temperature of from room temperature to 150° C., with an excess of solvent E that shifts solvent E'. To effect such shift, it is also possible to mix an excess of solvent E with the solution of the complex $M_mM'X_{2m}Y.nE'$ in solvent E'.

In general, the molar ratio of the reactants $MX_2$ to M'Y corresponds to the value of m in the complex to be prepared. However, it is also possible to obtain very active catalyst-forming components by using an excess of halide $MX_2$ with respect to the amount usually used for preparing the desired complex, i.e., a $MX_2/M'Y$ molar ratio higher than 2. In that case, by crystallization, by evaporation of the solvent, or by precipitation with a suitable solvent, a mixture is isolated consisting of the desired complex or the complex containing the solvent E' and of a complex made up of halide $MX_2$ and of solvent E or solvent E'.

Analogously, it is possible to use an excess of compound M'Y over the amount usually employed to obtain the desired complex, i.e., a $M'Y/MX_2$ molar ratio higher than 2. In that event, a mixture is isolated consisting of the desired complex or the complex containing solvent E', and of a complex consisting of compound M'Y and solvent E or solvent E'.

It is also possible to use mixtures of said performed complexes of the invention with an anhydrous Mg dihalide, the X-ray spectrum of said mixtures showing a halo having an intensity peak shifted with respect to the interplanar distance of the most intense line appearing in the spectrum of the Mg dihalide of normal type. The spectrum of Mg dichloride and dibromide of normal type is defined in ASTM 3-0854 for the dichloride and in ASTM 15-836 for the dibromide.

The content of Mg dihalide is comprised between 1 and 99% by wt., more particularly between 20 and 80%.

Said mixtures can be prepared, for example, by co-grinding the components under conditions such that the X-ray spectrum of the ground product shows the above modification.

The Ti, V and Zr compounds useful for preparing the new catalyst-forming complexes of the invention include: $TiCl_2$, $TiCl_3$, $TiCl_4$, $TiOCl_2$, $TiBr_4$, $TiI_4$, $Cl_3TiOCH_3$, $Cl_2Ti(OC_4H_9)_2$, $Ti(OC_4H_9)_4$, $Cl_3TiN(C_6H_5)_2$, $Cl_3TiOCOC_6H_5$, $Cl_3TiSC_6H_5$, $Cl_3Ti$-acetylacetonate, $Cl_3TiOSO_2C_6H_5$, $Cl_3TiOC_6H_5$, $VCl_3$, $VCl_4$, $VOCl_3$, $Cl_2VOC_4H_9$, $V(OC_4H_9)_3$, $ClV(acetylacetonate)_2$, $Cl_2VOCOC_6H_5$, $VO$-acetylacetonate, $ZrCl_4$, $Cl_3ZrOC_4H_9$.

Complexes within the general formula $M_mM'X_{2m}Y.nE$ include:

$MgTiCl_5.2CH_3COOC_2H_5$
$Mg_3Ti_2Cl_{12}.7CH_3COOC_2H_5$
$MgTiCl_5.6C_2H_5OH$
$MgTiCl_5.10CH_3OH$
$MgTiCl_5.5$ tetrahydrofuran
$Mg_3Ti_2Cl_{12}.7C_6H_5CN$
$Mg_3Ti_2Cl_{12}.6C_6H_5COOC_2H_5$
$MgTiCl_6.2CH_3COOC_2H_5$

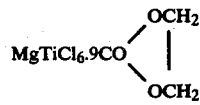

$MgTiCl_6.6C_5H_5N$
$MgTiCl_5(OCH_3).2CH_3COOC_2H_5$
$MgTiCl_5N(C_6H_5)_2.3CH_3COOC_2H_5$
$MgTiBr_2Cl_4.2(C_2H_5)_2O$
$MnTiCl_5.4C_2H_5OH$
$Mg_3V_2Cl_{12}.7CH_3COOC_2H_5$
$MgZrCl_6.4$ tetrahydrofuran.

Organometallic compounds which are particularly suitable for use as second catalyst-forming component in the preparation of the catalysts of the invention are: $Al(C_2H_5)_3$, $Al(C_2H_5)_2Cl$, $Al(i-C_4H_9)_3$, $Al(i-C_4H_9)_2Cl$, $Al_2(C_2H_5)_3Cl_3$, $Al(C_2H_5)_2H$, $Al(i-C_4H_9)_2H$, $Al(C_2H_5)_2Br$, $(C_2H_5)_2Al-O-Al(C_2H_5)_2$,

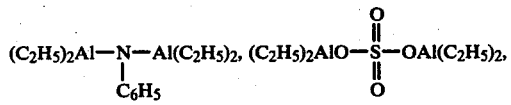

$LiAl(i-C_4H_9)_4$, $Li$-$i$-$C_4H_9$, $Zn(C_4H_9)_2$.

The molar ratio between the organometallic compound and the complex containing Ti, and/or V, and/or Zr is not critical. For polymerizing or copolymerizing ethylene and alpha-olefins it is preferably comprised between 10 and 1,000.

The catalysts of this invention are employed in the polymerization or copolymerization of olefins, in particular of ethylene, propylene, butene-1 and 4-methyl-pentene-1 by conventional techniques, i.e., in a liquid phase, either in the presence or absence of an inert solvent, or in gas phase. An aliphatic or cycloalyphatic hydrocarbon, such as, for example, hexane, heptane cyclohexane, may be used as inert polymerization solvent.

The (co) polymerization temperature may be comprised between $-80°$ C. and $200°$ C., preferably between $50°$ C. and $100°$ C., operating at atmospheric pressure or under pressure. Regulation of the molecular weight of the homopolymer or copolymer produced can be effected by known methods, for example by carrying out the polymerization reaction in the presence of known molecular weight regulators, such as alkyl halides, organometallic compounds of Zn or Cd, or hydrogen.

The following examples are given to illustrate the invention and are not intended to be limiting.

EXAMPLE 1

1.1 g of $TiCl_3$ of the HR type, prepared by reduction of $TiCl_4$ with $H_2$, (7.1 m. moles) are dissolved, in a nitrogen atmosphere, in 100 ml of anhydrous ethyl acetate.

Similarly, 0.68 g of anhydrous $MgCl_2$ (7.1 m. moles) are dissolved in 31 ml of anhydrous ethyl acetate.

The two solutions are mixed and reacted at $60°$ C. for 2 hours. The extremely soluble reaction product was isolated by evaporation of the solvent.

A grey-green powder (A) was thus obtained that revealed, on analysis, a composition corresponding to formula $MgTiCl_5.2CH_3COOC_2H_5$.

The X-ray diffraction pattern and the infrared absorption bands characteristic of group $>C=O$ revealed that such product was a well-defined compound.

By way of comparison, complexes $TiCl_3.CH_3COOC_2H_5$ and $MgCl_2.CH_3COOC_2H_5$ and their mechanical mixture in a 1:1 molar ratio were examined. The X-ray and infrared spectra were entirely different from those of product (A).

The ethylene polymerization tests carried out by using, as catalyst components, the complexes $MgTiCl_5.2CH_3COOC_2H_5$, $TiCl_3.CH_3COOC_2H_5$ and the above-cited mechanical mixture are reported in the Table below (Tests I, II and III).

EXAMPLE 2

6.92 g of anhydrous $MgCl_2$ (72.7 m. moles) are dissolved, in a nitrogen atmosphere, in 100 ml of anhydrous ethyl acetate. Analogously, 7.48 g of $TiCl_3$ of the HR type (48.46 m. moles) are dissolved in 72 ml of anhydrous ethyl acetate. The two solutions are mixed and reacted under stirring for 4 hours at $60°$ C. The resulting reaction product is extremely soluble and is isolated by evaporation of the solvent. A light green powder (A) is obtained. By analysis it was found to have a composition corresponding to formula $Mg_3Ti_2Cl_{12}.7CH_3COOC_2H_5$.

The X-ray pattern of such product (A) exhibits diffractions attributable neither to $TiCl_3.CH_3COOC_2H_5$ nor to $MgCl_2.2CH_3COOC_2H_5$; similarly, the absorption bands of group $>C=O$ in the infrared spectrum have positions different from those corresponding to the complexes of TiCl$_3$ and of MgCl$_2$ with ethyl acetate.

The ethylene polymerization tests using such complex (A) as catalyst component are reported in the Table (tests IV and V).

EXAMPLE 3

In a nitrogen atmosphere, 0.95 g of TiCl$_3$ of the HR type (6.1 m. moles) and 0.65 g of anhydrous MgCl$_2$ (6.1 m. moles) are separately dissolved, respectively, in 80 ml of deaerated anhydrous ethyl alcohol and in 20 ml of the same alcohol.

The two solutions are gathered and reacted at room temperature for 12 hours. The reaction product is isolated by evaporation of the solvent and dried. A grey powder is thus obtained. On analysis it has a composition corresponding to the formula: MgTiCl$_5$.6C$_2$H$_5$OH. The ethylene polymerization conducted by using such complex as catalytic component is reported in the Table (test VI).

EXAMPLE 4

In a nitrogen atmosphere, 1.4 g of TiCl$_3$ of the HR type (9.05 m. moles) and 0.86 g of anhydrous MgCl$_2$ (9.05 m. moles) are separately dissolved in, respectively, 100 ml of deaerated anhydrous methanol and in 50 ml of the same alcohol. The two solutions are mixed and reacted at 50° C. for 4 hours. The reaction product is isolated by evaporation of the solvent and dried.

The grey powder so obtained has, on analysis, a composition corresponding to the formula: MgTiCl$_5$.10CH$_3$OH.

The polymerization of ethylene conducted by employing such complex as catalytic component is reported in the Table (test VII).

EXAMPLE 5

In an inert atmosphere, 2.4 g (10 m. moles) of MgCl$_2$.2 tetrahydrofuran and 3.6 g (10 m. moles) of TiCl$_3$.3 tetrahydrofuran are separately dissolved in, respectively, 300 ml of anhydrous tetrahydrofuran and in 200 ml of anhydrous tetrahydrofuran. The two solutions are gathered and reacted under stirring at room temperature for 2 hours. The product is isolated by evaporation of the solvent and dried.

A grey powder is thus obtained. On analysis it has a composition corresponding to the formula: MgTiCl$_5$.5 tetrahydrofuran.

The ethylene polymerization carried out by using such complex as catalyst component is reported in the Table (test VIII).

EXAMPLE 6

2.8 g of anhydrous MgCl$_2$ (29.5 m. moles) are dissolved in 59 ml of anhydrous ethyl acetate. Separately, 4.4 g of TiCl$_3$ARA, prepared by reduction of TiCl$_4$ with metal Al and activated by dry grinding, (22.1 m. moles) are dissolved in 60 ml of anhydrous ethyl acetate. The two solutions are gathered and allowed to react at 50° C. for 4 hours.

The resulting dark green solution is evaporated to dryness, thus obtaining a violet solid which, on analysis, has a composition corresponding to the formula: Mg$_4$Ti$_3$AlCl$_{20}$.12CH$_3$COOC$_2$H$_5$. This complex contained also Al due to the fact that TiCl$_3$ prepared by reduction of TiCl$_4$ with Al was in the form of 3TiCl$_3$.AlCl$_3$, known as TiCl$_3$ ARA.

The ethylene polymerization test conducted by using such complex as catalytic component is reported in the Table (test IX).

EXAMPLE 7

1.6 g of the complex of formula Mg$_3$Ti$_2$Cl$_{12}$.7CH$_3$COOC$_2$H$_5$, prepared as described in Example 2, are suspended in 30 ml of ethyl benzoate and the suspension thus obtained is heated to 100° C. for 6 hours. The reaction product is filtered, washed at room temperature with 200 ml of n-heptane, and dried under vacuum.

The yellow solid so obtained exhibited, on analysis, a composition corresponding to formula Mg$_3$Ti$_2$Cl$_{12}$.6C$_6$H$_5$COOC$_2$H$_5$. The ethylene polymerization tests carried out by using such complex as catalyst component are reported in the Table (tests X, XI and XXXVI).

EXAMPLE 8

1.8 g of the complex having the formula Mg$_3$Ti$_2$Cl$_{12}$.7CH$_3$COOC$_2$H$_5$, prepared according to Example 2, are suspended in 30 ml of benzonitrile. Following the modalities of Example 7, a brown solid was isolated, that exhibited, on analysis, a composition corresponding to formula Mg$_3$Ti$_2$Cl$_{12}$.7C$_6$H$_5$CN.

The ethylene polymerization conducted by employing such complex as catalytic component is reported in the Table (test XII).

EXAMPLE 9

In a nitrogen atmosphere, 2.6 g of anhydrous MgCl$_2$ (27.4 m. moles) and 3 ml of TiCl$_4$ (27.4 m. moles) are dissolved separately in 200 ml of anhydrous ethyl acetate and in 60 ml of anhydrous ethyl acetate, respectively. The two solutions are gathered and reacted under stirring for 4 hours at 60° C. From the concentrated solution a yellow crystalline solid precipitates on cooling, which is then isolated, recrystallized from ethyl acetate and dried under vacuum at 50° C. Such product, that decomposed at 190° C., revealed on analysis a composition corresponding to formula MgTiCl$_6$.2CH$_3$COOC$_2$H$_5$.

The infrared and X-rays spectra of such product reveal that it is a well-defined compound, being thoroughly different from the infrared and X-rays spectra of the complexes [TiCl$_4$.CH$_3$COOC$_2$H$_5$]$_2$ and MgCl$_2$.CH$_3$COOC$_2$H$_5$.

The ethylene polymerization tests conducted by employing, as catalyst component, the complex described hereinabove and, for comparative purposes, the complex [TiCl$_4$.CH$_3$COOC$_2$H$_5$]$_2$ are reported in the Table (Tests XIII and XIV).

EXAMPLE 10

0.22 ml of TiCl$_4$ (2 m. moles) are added dropwise to 20 ml of a 0.5 M solution of MgCl$_2$ in ethyl acetate (10 m. moles of MgCl$_2$) heated to 50° C. The mixture is reacted at 50° C. for 2 hours, then the solvent is evaporated under vacuum and the grey precipitate is dried at 40° C.

The X-ray diffraction pattern reveals that such product is a mechanical mixture of MgTiCl$_6$.2CH$_3$COOC$_2$H$_5$ and MgCl$_2$.CH$_3$COOC$_2$H$_5$.

EXAMPLE 11

Example 10 is repeated using 0.11 ml of pure TiCl$_4$ (1 m. mole). The resulting precipitate is subjected, after drying, to X-ray analysis and proves to be a mixture of $MgTiCl_6.2CH_3COOC_2H_5$ and $MgCl_2.CH_3COOC_2H_5$. The titanium content of such mixture is 1.1%.

The ethylene polymerization test carried out using the above-described product as catalytic component is reported in the Table (Test XV).

EXAMPLE 12

Example 10 is repeated, but employing 4.4 ml of pure $TiCl_4$ (40 m. moles). The precipitate so obtained is subjected, after drying, to analysis and revealed to be a mixture of $MgTiCl_6.3CH_3COOC_2H_5 + [TiCl_4.CH_3COOC_2H_5]_2$.

The ethylene polymerization test conducted by using the product of this example as catalytic component is reported in the Table (test XVI).

EXAMPLE 13

2.6 g of $MgCl_2$ (27.3 m. moles) are dissolved in 50 ml of anhydrous ethylene carbonate at 50° C. Separately, 3 ml of $TiCl_4$ (27.3 m. moles) are dissolved in 100 ml of anhydrous ethylene carbonate at 50° C. The two solutions are mixed and allowed to react for 7 hours at 50° C.

A powdery yellow precipitate is thus obtained, isolated by hot filtration, and dried at 50° C. under vacuum.

The dried yellow powder obtained corresponded on analysis, to the formula:

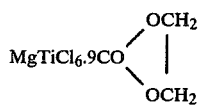

The ethylene polymerization test conducted by employing such complex as catalytic component is reported in the Table (test XVII).

EXAMPLE 14

35 ml of pyridine re mixed, dropwise, with 20 ml of a solution of 4.6 g of the complex $MgTiCl_6.2CH_3COOC_2H_5$ (prepared according to Example 9) in ethyl acetate. After a 2-hour reaction at 60° C., a yellow precipitate is obtained: it is filtered and dried by evaporation of the solvent. The isolated yellow solid exhibited, on analysis, a composition corresponding to formula $MgTiCl_6.6C_5H_5N$.

The ethylene polymerization test conducted by using such complex as catalytic component is reported in the Table (test XVIII).

EXAMPLE 15

2 g of the complex $MgTiCl_6.2CH_3COOC_2H_5$ (prepared as described in Example 9) are suspended in 30 ml of $POCl_3$. The suspension is reacted for 4 hours at 60° C. under stirring, then evaporated to dryness, thus isolating a yellow powder that, on analysis, is found to have a composition corresponding to formula $MgTiCl_6.5POCl_3$.

The ethylene polymerization effected by using such complex as catalytic component is reported in the Table (Test XIX).

EXAMPLE 16

In a nitrogen atmosphere, 3.15 g (17 m. moles) of $Cl_3TiOCH_3$ and 1.62 g (17 m. moles) of anhydrous $MgCl_2$ are separately dissolved in, respectively, 40 ml of anhydrous ethyl acetate and in 35 ml of anhydrous ethyl acetate. The two solutions are gathered and heated under stirring to 60° C. for 5 hours.

The solvent is evaporated and the resulting product is dried at 50° C. under vacuum. A yellow powder is isolated that, on analysis, shows a composition corresponding to formula $MgTiCl_5(OCH_3).2CH_3COOC_2H_5$.

The ethylene polymerization test conducted by using such complex as catalyst component is reported in the Table (Test XX).

EXAMPLE 17

3.41 g (12.4 m. moles) of $Cl_3TiOOC-C_6H_5$ are dissolved in 50 ml of anhydrous ethyl acetate, and the resulting solution is mixed with 24.8 ml of a 0.5 M solution of anhydrous $MgCl_2$ in ethyl acetate (12.4 m. moles of $MgCl_2$). The mixture is reacted at 50° C. for 4 hours under stirring.

After evaporation of the solvent and drying of the resulting product, a green powder is obtained that, on analysis, is found to have the following composition: $MgTiCl_5(OOC-C_6H_5).2CH_3COOC_2H_5$.

The ethylene polymerization test conducted by using such complex as catalytic component is reported in the Table (Test XXI).

EXAMPLE 18

26 m. moles of $Cl_3TiN(C_6H_5)_2$ are dissolved in 150 ml of anhydrous ethyl acetate, and the resulting solution is added to another solution containing 26 m. moles of anhydrous $MgCl_2$ in 52 ml of ethyl acetate. The mixture is allowed to react for 4 hours under stirring at room temperature, then it is evaporated and dried: a brown powder is thus obtained that, on analysis, has the following composition: $MgTiCl_5[N(C_6H_5)_2].3CH_3COOC_2H_5$.

The ethylene polymerization effected by using such complex as catalytic component is reported in the Table (Test XXII).

EXAMPLE 19

In a nitrogen atmosphere and at a temperature of 60° C. 2.12 g of anhydrous $MgCl_2$ (22.4 m. moles) are dissolved in 100 ml of deaerated anhydrous n-butyl acetate. 7.6 ml of $Ti(O-nC_4H_9)_4$ (22.4 m. moles) are added, always at 60° C., to such solution, and the whole is reacted for 4 hours at 60° C. under stirring.

By evaporation of the solvent under vacuum at 60° C., a colorless pasty product is isolated; on analysis it has a composition corresponding to formula $MgTiCl_2(O-nC_4H_9)_4.2CH_3COOC_4H_9$.

The ethylene polymerization test carried out by using such complex as catalytic component is reported in the Table (Test XXIII).

EXAMPLE 20

1.98 ml (18 m. moles) of $TiCl_4$ are added dropwise to a solution of 3.3 g of $MgBr_2$ (18 m. moles) in 200 ml of anhydrous diethyl ether. A red precipitate forms immediately. It is reacted at reflux for 4 hours; then the solvent is evaporated and a brown powder is obtained which, on analysis, has a composition corresponding to formula $MgTiCl_4Br_2.2(C_2H_5)_2O$.

The ethylene polymerization test effected by using such complex as catalytic component is reported in the Table (Test XXIV).

EXAMPLE 21

1.7 g of anhydrous $MnCl_2$ (13.5 m. moles) are dissolved in 100 ml of anhydrous ethanol. Separately, 2.08 g of $TiCl_3$ (13.5 m. moles) are dissolved in 100 ml of anhydrous ethanol. The two solutions are gathered together and reacted at 25° C. for 4 hours and at 50° C. for 8 hours.

The resulting sky-blue solution is evaporated to dryness, thus obtaining a grey solid that, on analysis, has a composition corresponding to formula $MnTiCl_5.4C_2H_5OH$.

The ethylene polymerization test conducted by employing such complex as catalytic component is reported in the Table (Test XXV).

EXAMPLE 22

5.6 g of anhydrous $MgCl_2$ (59 m. moles) are dissolved, in a nitrogen atmosphere, in 100 ml of anhydrous ethyl acetate. Similarly, 6.17 g of $VCl_3$ (39.2 m. moles) are dissolved in 150 ml of anhydrous ethyl acetate.

The two solutions are gathered together and reacted under stirring at 60° C. for 4 hours.

The resulting green solution is evaporated to dryness, thus obtaining a brown powder which, on analysis, exhibits a composition corresponding to formula $Mg_3V_2Cl_{12}.7CH_3COOC_2H_5$.

The ethylene polymerization conducted by using such complex—as catalytic component is reported in the Table (Test XXVI).

EXAMPLE 23

0.203 g of anhydrous $MgCl_2$ (2.14 m. moles) is dissolved in 60 ml of anhydrous tetrahydrofuran. Separately, 0.50 g of $ZrCl_4$ (2.14 m. moles) is suspended in 100 ml of anhydrous tetrahydrofuran. The solution is added to the suspension and the whole is reacted at 25° C. for 6 hours. It is then evaporated to dryness, thus obtaining a white solid that, on analysis, has a composition corresponding to formula $MgZrCl_6.4C_4H_8O$.

The ethylene polymerization test conducted by using such complex as catalytic component is reported in the Table (Test XXVII).

EXAMPLE 24

0.87 g of anhydrous $CaCl_2$ (7.8 m. moles) is dissolved, in a nitrogen atmosphere, in 50 ml of deaerated anhydrous $C_2H_5OH$; analogously, 1.2 g of $TiCl_3$ of the HR type (7.8 m. moles) are dissolved in 100 ml of deaerated anhydrous $C_2H_5OH$. The two solutions are gathered and allowed to react together at 40° C. for 8 hours.

By evaporation of the solvent under vacuum at 40° C., a grey solid is isolated. On analysis, it is found to have composition corresponding to formula $CaTiCl_5.4C_2H_5OH$.

The ethylene polymerization test conducted by using such complex as catalytic component is reported in Test XXVIII of the Table.

EXAMPLE 25

2.97 g of anhydrous $CaI_2$ (10 m. moles) are dissolved, in a nitrogen atmosphere, in 100 ml of deaerated anhydrous $C_2H_5OH$; analogously, 1.58 g of $TiCl_3$ of the HR type (10 m. moles) are dissolved in 60 ml of deaerated anhydrous $C_2H_5OH$. The two solutions are gathered and reacted together at 40° C. for 3 hours.

By evaporation of the solvent under vacuum at 40° C., a violet solid is isolated; on analysis, it has a composition corresponding to formula $CaTiCl_3I_2.5C_2H_5OH$.

The ethylene polymerization test conducted by employing such complex as catalytic component is reported in Test XXIX of the Table.

EXAMPLE 26

2.67 g of the complex $MgTiCl_6.4CH_3COOC_2H_5$ (prepared as in example 9 with the only difference that drying was carried out at 25° C. instead of at 50° C.) were suspended in 30 ml of diethyl malonate. The whole was reacted at 60° C. under stirring for 3 hours; the suspension was then dried by evaporation thus isolating a yellow powder which on analysis showed the composition

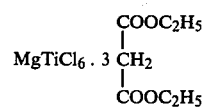

The ethylene polymerization test conducted by using such a complex as catalytic component is reported on the Table (test XXX).

EXAMPLE 27

1.9 g of the complex $MgTiCl_6.4CH_3COOC_2H_5$ (prepared as in example 9 with the only difference that drying was carried out at 25° C. instead of at 50° C.) were added to 5 ml of anhydrous $CH_3COOC_2H_5$; subsequently 20 ml of hexamethyl phosphoramide were added dropwise. The whole was reacted at 25° C. under stirring for 4 hours and then evaporated to dryness, thus isolating a yellow powder which on analysis showed the composition

The ethylene polymerization test conducted by using such a complex as catalytic component is reported on the Table (test XXXI).

EXAMPLE 28

3.6 g of the complex $MgTiCl_6.4CH_3COOC_2H_5$ (prepared as in example 9 with the only difference that drying was carried out at 25° C. instead of at 50° C.) were dissolved in 30 ml of triphenyl phosphite. The solution was reacted under stirring at 25° C. for 4 hours and the reaction mass was evaporated to dryness, thus isolating an orange-coloured oil which on analysis showed the composition

The ethylene polymerization test conducted by using such a complex as catalytic component is reported on the Table (test XXXII).

EXAMPLE 29

0.52 g (5.46 m. mols) of anhydrous $MgCl_2$ were dissolved, under nitrogen atmosphere, in 11 ml of anhydrous ethyl acetate and this solution was added to a suspension of 0.65 g (5.46 m mols) of $TiCl_2$ in 100 ml of anhydrous ethyl acetate. The whole was reacted under stirring at 60° C. for 6 hours. The resulting suspension was evaporated to dryness, thus isolating a black powder which on analysis showed the composition $MgTiCl_4.2CH_3COOC_2H_5$ The ethylene polymerization test conducted by using such a complex as catalytic component is reported on the Table (test XXXIII).

EXAMPLE 30

Under nitrogen atmosphere were dissolved separately: 1.9 g (20 m. mols) of anhydrous $MgCl_2$ in 40 ml of anhydrous ethyl acetate; 1.10 ml (10 m. mols) of $TiCl_4$ in 20 ml of anhydrous ethyl acetate; 1.15 ml (10 m. mols) of $SnCl_4$ in 20 ml of anhydrous ethyl acetate.

The three solutions were gathered and reacted under stirring at 70° C. for 4 hours. From the reacted solution after concentration and cooling it precipitated a crystalline yellow product, which was isolated by filtration and dried at 25° C. under vacuum. The product on analysis showed the composition $Mg_4TiSn_{1.5}Cl_{18}.14CH_3COOC_2H_5$ The ethylene polymerization test conducted by using such a complex as catalytic component is reported on the Table (test XXXIV).

Ethylene Polymerization in Inert Solvent

A suitable amount of one of the catalytic complexes prepared in the examples and 1000 ml of deaerated anhydrous desulphurized n-heptane are introduced, along with 2 ml of an alkyl aluminum compound, in a nitrogen atmosphere, into a stainless steel autoclave, having a capacity of 3 liters, equipped with an anchor stirrer and heated to the desired temperature.

Hydrogen and ethylene, at the prefixed partial pressures, are added thereto, and the total pressure is kept constant during the whole polymerization by a continuous ethylene feeding.

After a suitable reaction period, polymerization is stopped, the raw polymerization product is dried. The polymer inherent viscosity $\eta_{in}$ is measured in tetrahydronaphthalene at 135° C., using concentrations of 0.25 g of polymer in 100 ml of solvent; the yield is expressed in grams of polymer obtained per gram of Ti or V or Zr.

The results of the various tests are reported in the Table (Tests I to XXXIV).

Ethylene Polymerization in Gas Phase 200 g of powdery fully dried polyethylene, a suitable amount of one of the catalytic complexes prepared in examples, 30 ml of deaerated anhydrous desulphurized n-heptane and 2 m. mols of a trialkyl aluminum were introduced into a stainless steel 2-liter autoclave equipped with an anchor stirrer. After evaporation of the solvent by heating at 95° C. under vacuum, 2 atm. of hydrogen and ethylene up to a total pressure of 19 atm. were fed into the autoclave. The pressure was kept constant during the whole reaction time by feeding ethylene continuously.

After a suitable reaction time the polymerization was stopped and the formed polymer isolated.

This test of ethylene polymerization in gas phase is reported on the Table (test XXXV).

Propylene Polymerization 100 mg of the catalytic complex prepared in Example 7 and 50 ml of the deaerated, anhydrous desulphurized n-heptane are introduced, along with 2 ml of $Al(i-C_4H_9)_3$, under a dry argon pressure, into a stainless steel 2-liter autoclave, equipped with an anchor stirrer, heated to 65° C. and containing hydrogen for a partial pressure of 0.85 atm. as well as 500 g of anhydrous propylene. The reaction is stopped after 5 hours, the unpolymerized propylene is discharged and the polymer is taken out from the autoclave, dried and weighed.

The results of this polymerization test are reported in the Table (Test XXXVI).

TABLE

| Test | Catalytic Complex Type | mg | x M' | Al Alkyl 2ml |
|---|---|---|---|---|
| I | $MgTiCl_3.2CH_3COOC_2H_5$ (Ex. 1) | 24 | Ti-11.5 | $Al(iC_4H_9)_3$ |
| II | $TiCl_3.CH_3COOC_2H_5$ (Ex. 1) | 25 | Ti-20.7 | $Al(iC_4H_9)_3$ |
| III | Mechanical Mixture 1:1 (Ex. 1) $TiCl_3.CH_3COOC_2H_5 + MgCl_2.CH_3COOC_2H_5$ | 33 | Ti-11.3 | $Al(iC_4H_9)_3$ |
| IV | $Mg_3Ti_2Cl_{12}.7CH_3COOC_2H_5$ (Ex. 2) | 18 | Ti-8.1 | $Al(iC_4H_9)_3$ |
| V | $Mg_3Ti_2Cl_{12}.7CH_3COOC_2H_5$ (Ex. 2) | 20 | Ti-8.1 | $Al(C_2H_5)_3$ |
| VI | $MgTiCl_5.6C_2H_5OH$ (Ex. 3) | 12 | Ti-10.0 | $Al(iC_4H_9)_3$ |
| VII | $MgTiCl_3.10CH_3OH$ (Ex. 4) | 35 | Ti-8.2 | $Al(iC_4H_9)_3$ |
| VIII | $MgTiCl_5.5C_4H_8O$ (Ex. 5) | 20 | Ti-7.8 | $Al(iC_4H_9)_3$ |
| IX | $Mg_4Ti_3AlCl_{20}.12CH_3COOC_2H_5$ (Ex. 6) | 22 | Ti-8.3 | $Al(iC_4H_9)_3$ |
| X | $Mg_3Ti_2Cl_{12}.6C_6H_5COOC_2H_5$ (Ex. 7) | 27 | Ti-6.4 | $Al(iC_4H_9)_3$ |
| XI | $Mg_3Ti_2Cl_{12}.6C_6H_5COOC_2H_5$ (Ex. 7) | 48 | Ti-6.4 | $Al(C_2H_5)_2Cl$ |
| XII | $Mg_3Ti_2Cl_{12}.7C_6H_5CH$ (Ex. 8) | 49 | Ti-7.7 | $Al(iC_4H_9)_3$ |

| | Polymerization | | | | Polymer | | |
|---|---|---|---|---|---|---|---|
| Test | Ethylene Atm | $H_2$ Atm | Temp. °C. | Time Required h | Product g | $\eta$ in dl/g | Yield |
| I | 10 | 3 | 85 | 4 | 450 | 1.6 | 162,000 |
| II | 10 | 3 | 85 | 4 | 9 | — | 1,745 |
| III | 10 | 3 | 85 | 4 | 35 | 1.8 | 9,370 |
| IV | 9 | 4 | 85 | 4 | 290 | 1.6 | 199,000 |
| V | 10 | 3 | 85 | 4 | 180 | 2.4 | 111,000 |
| VI | 10.5 | 2.5 | 90 | 4 | 160 | 2.3 | 133,000 |
| VII | 10 | 3 | 85 | 4 | 290 | 2.6 | 101,000 |
| VIII | 10 | 3 | 85 | 4 | 210 | 2.0 | 134,000 |
| IX | 10 | 3 | 85 | 4 | 330 | 2.0 | 180,000 |
| X | 10 | 3 | 85 | 4 | 280 | 2.2 | 167,000 |

TABLE-continued

| Catalytic Complex | | | | | | Al Alkyl |
|---|---|---|---|---|---|---|
| XI | 10 | 3 | 85 | 4 | 310 | 2.7 | 101,000 |
| XII | 10 | 3 | 85 | 5 | 280 | 2.2 | 74,200 |

That we claimed is:

1. Process for polymerizing or copolymerizing olefins which comprises effecting the polymerization or copolymerization in the presence of a catalyst prepared by mixing (1) a catalyst component having the formula $$M_m M' X_{2m} Y \cdot nE$$

in which

M = at least one metal selected from the group consisting of Mg, Mn and Ca;

m = a number from 0.5 to 2;

M' = at least one metal selected from the group consisting of Ti, V and Zr;

X = Cl, Br or I;

Y = a radical selected from the group consisting of halogen, the groups —NR$_2$, —OR, and $$-O-\overset{\overset{\displaystyle O}{\|}}{C}-R,$$

or mixtures thereof, in which R is a hydrocarbon radical, such radicals or groups being present in an amount corresponding to the valence of M';

n = a number from 0.5 m to 20 m; and

E = a hydrocarbyl electron-donor compound selected from the group consisting of (a) esters of organic carboxylic acids; (b) amines; (c) esters of carbonic acid; (d) nitriles; (e) phosphoramides; (f) esters of phosphoric and phosphorous acid and (g) phosphorus oxychloride; with (2) an alkyl Al compound.

2. Process for polymerizing or copolymerizing olefins according to claim 1, in which a portion of the Ti, V and/or Zr represented by M' in the catalyst formula is replaced by metals selected from the group consisting of Zn, Al, Sn and transition metals selected from the group consisting of Fe, Co, Ni, Cr or Mo, in such an amount that the atomic ratio between such metals and Ti, V and/or Zr ranges from 0.1:1 to 2:1.

3. Process for polymerizing or copolymerizing olefins, according to claim 1, which comprises effecting the polymerization or copolymerization in the presence of a catalyst component (1) which consists of a mixture of 99% to 1% by weight of the metal complex $M_m M' X_{2m} Y \cdot nE$ and correspondingly 1% to 99% by weight of an anhydrous magnesium dihalide, the X-rays spectrum of which mixture shows a halo having an intensity peak shifted with respect to the interplanar distance of the most intense line appearing in the spectrum of the corresponding magnesium dihalide of normal type.

4. Process for polymerizing ethylene according to claim 1, which comprises contacting ethylene in the gas phase with a catalyst prepared by mixing a catalyst component (1) with a catalyst component (2) which is an Al trialkyl compound.

* * * * *